United States Patent
Nishikawa et al.

(10) Patent No.: US 10,625,591 B2
(45) Date of Patent: Apr. 21, 2020

(54) ELECTRIC VEHICLE

(71) Applicant: Toyota Jidosha Kabushiki Kaisha, Toyota-shi Aichi-ken (JP)

(72) Inventors: Yukinobu Nishikawa, Anjo (JP); Takeshi Kuwahara, Toyota (JP); Eiji Ito, Nisshin (JP); Yasuki Yoshikawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 2 days.

(21) Appl. No.: 16/136,665

(22) Filed: Sep. 20, 2018

(65) Prior Publication Data
US 2019/0084403 A1 Mar. 21, 2019

(30) Foreign Application Priority Data

Sep. 20, 2017 (JP) ................................ 2017-180723
Feb. 16, 2018 (JP) ................................ 2018-026483

(51) Int. Cl.
| | | |
|---|---|---|
| *B60K 17/10* | (2006.01) | |
| *B60K 6/405* | (2007.10) | |
| *B60K 1/00* | (2006.01) | |
| *B60K 1/04* | (2019.01) | |
| *B60K 5/04* | (2006.01) | |

(52) U.S. Cl.
CPC ............... *B60K 6/405* (2013.01); *B60K 1/00* (2013.01); *B60K 17/105* (2013.01); *B60K 1/04* (2013.01); *B60K 5/04* (2013.01); *B60K 2001/001* (2013.01); *B60K 2001/0405* (2013.01)

(58) Field of Classification Search
CPC ...... B60K 2007/0061; B60K 2001/001; B60K 17/28
USPC .......................... 180/292, 65.235, 65.6, 65.7
See application file for complete search history.

(56) References Cited

U.S. PATENT DOCUMENTS

| | | | | |
|---|---|---|---|---|
| 5,513,719 | A * | 5/1996 | Moroto | B60K 6/24 180/65.21 |
| 5,562,565 | A * | 10/1996 | Moroto | B60K 6/26 180/65.6 |
| 6,301,885 | B1 * | 10/2001 | Johnson | B60K 17/105 60/487 |
| 6,378,300 | B1 * | 4/2002 | Johnson | B60K 17/105 60/399 |

(Continued)

FOREIGN PATENT DOCUMENTS

| | | |
|---|---|---|
| JP | 2006345601 A | 12/2006 |
| JP | 2016022799 A | 2/2016 |

*Primary Examiner* — Jeffrey J Restifo
(74) *Attorney, Agent, or Firm* — Dinsmore & Shohl LLP (57) ABSTRACT

An electric vehicle comprises: an electric drive unit including an electric motor used as a drive power source, a transaxle including a differential device and coupled to a motor shaft of the electric motor in a power transmittable manner on one end side of the electric motor in a direction of a motor centerline to transmit an output of the electric motor through the differential device to a pair of drive shafts, and a case housing the electric motor and the transaxle. The case includes a first end surface portion located on the other end side of the electric motor in the motor centerline direction and rotatably supporting the motor shaft, and an accessory component of the vehicle is attached to an outside surface of the first end surface portion.

18 Claims, 9 Drawing Sheets

(56) References Cited

U.S. PATENT DOCUMENTS

| | | | | |
|---|---|---|---|---|
| 6,732,526 B2* | 5/2004 | Minagawa | B60K 6/365 | 180/65.235 |
| 7,081,060 B2* | 7/2006 | Hata | B60L 58/40 | 475/5 |
| 7,383,913 B1* | 6/2008 | Tsukamoto | B60K 17/105 | 180/307 |
| 7,988,579 B2* | 8/2011 | Tabata | B60L 50/16 | 475/5 |
| 8,140,204 B2* | 3/2012 | Okubo | B60W 30/188 | 701/22 |
| 8,700,243 B2* | 4/2014 | Kamijo | F02N 11/0844 | 180/65.265 |
| 8,708,070 B2* | 4/2014 | Tsuchida | B60K 6/365 | 123/196 R |
| 8,727,928 B2* | 5/2014 | Harashima | B60K 1/00 | 180/65.31 |
| 8,955,658 B2* | 2/2015 | Ideshio | F16D 33/18 | 192/3.26 |
| 8,992,366 B2* | 3/2015 | Gassmann | B60K 1/00 | 475/149 |
| 8,998,765 B2* | 4/2015 | Sten | F16H 48/36 | 475/205 |
| 9,039,559 B2* | 5/2015 | Gassmann | B60K 1/00 | 475/150 |
| 9,067,598 B2* | 6/2015 | McGrogan | B60L 50/16 | |
| 9,102,226 B2* | 8/2015 | Makino | B60L 50/61 | |
| 9,102,233 B2* | 8/2015 | Knoblauch | B60K 1/02 | |
| 9,156,348 B1* | 10/2015 | Swales | B60K 17/046 | |
| 9,303,698 B2* | 4/2016 | Sugiyama | F16H 57/0445 | |
| 9,303,745 B2* | 4/2016 | Wenthen | B60K 1/00 | |
| 9,625,021 B2* | 4/2017 | Knoblauch | B60L 15/2054 | |
| 9,637,127 B1* | 5/2017 | Cooper | B60W 30/18 | |
| 9,671,016 B2* | 6/2017 | Nakayama | B60K 17/16 | |
| 9,683,650 B2* | 6/2017 | Kajikawa | F16H 57/045 | |
| 9,707,834 B2* | 7/2017 | Lee | F16H 3/663 | |
| 9,719,584 B1* | 8/2017 | Duan | F16H 57/10 | |
| 9,783,035 B1* | 10/2017 | Huang | B60K 1/00 | |
| 9,809,105 B1* | 11/2017 | Janson | B60K 6/445 | |
| 9,822,860 B2* | 11/2017 | Kaltenbach | B60K 1/00 | |
| 9,850,999 B2* | 12/2017 | Tahara | F16H 57/0471 | |
| 10,094,461 B2* | 10/2018 | Gassmann | F16H 48/40 | |
| 10,100,711 B2* | 10/2018 | Mori | F01P 11/08 | |
| 10,300,788 B2* | 5/2019 | Nishiumi | B60K 15/067 | |
| 2014/0364266 A1* | 12/2014 | Janson | B60K 6/50 | 475/213 |
| 2015/0148174 A1* | 5/2015 | Nakamura | B60K 1/00 | 475/149 |
| 2018/0201125 A1* | 7/2018 | Mori | B60K 1/04 | |
| 2018/0251023 A1* | 9/2018 | Nishiumi | B60L 50/71 | |

* cited by examiner

ELECTRIC VEHICLE

CROSS-REFERENCE TO RELATED APPLICATIONS

The present application claims priority to Japanese Patent Application No. 2017-180723 filed on Sep. 20, 2017 and Japanese Patent Application No. 2018-026483 filed on Feb. 16, 2018 which claims the priority from Japanese Patent Application No. 2017-180723, which are incorporated herein by reference in its entirety including the specification, drawings and abstract.

1. TECHNICAL FIELD

The present disclosure relates to an electric vehicle and, more particularly, to an improvement of an electric vehicle in which a transaxle including a differential device is housed in a case together with an electric motor.

2. BACKGROUND

An electric vehicle is known that includes an electric drive unit having (a) an electric motor used as a drive power source, (b) a transaxle including a differential device and coupled in a power transmittable manner to a motor shaft of the electric motor on one end side of the electric motor regarding a direction of a motor centerline to transmit an output of the electric motor through the differential device to a pair of drive shafts, and (c) a case housing the electric motor and the transaxle. A vehicle described in Patent Document 1 is an example thereof and comprises an electric compressor as an accessory component disposed on an outer circumferential surface of the case (near the transaxle).

PRIOR ART DOCUMENT

Patent Document

Patent Document 1: Japanese Laid-Open Patent Publication No. 2016-22799

In an electric vehicle including suck an electric drive unit, when a force (vibration) caused by a vibration source such as a torque fluctuation of the electric motor and a meshing vibration of gears is transmitted from the motor shaft through bearings to the case and further propagated from the case through the air, sound may be generated as motor noise or gear noise, deteriorating NV [Noise, Vibration] performance in the vehicle interior during acceleration/deceleration, for example. Although it is conceivable that the transmission of the force is suppressed by the structure of the case, this leads to new problems such as increases in size and weight of the case. If an accessory component is disposed on the outer circumferential surface of the case as in the conventional technique, the accessory component functions as a mass damper to provide an effect of damping vibrations caused by the force; however, this is not fully satisfactory.

SUMMARY

The present disclosure was conceived in view of the situations and it is therefore an object of the present disclosure to suppress deterioration in NV performance due to motor noise and/or gear noise in an electric vehicle including an electric drive unit having a transaxle housed in a case together with an electric motor.

To achieve the above object, a first aspect of the present disclosure provides an electric vehicle comprising: an electric drive unit including (a) an electric motor used as a drive power source, (b) a transaxle including a differential device and coupled to a motor shaft of the electric motor in a power transmittable manner on one end side of the electric motor in a direction of a motor centerline to transmit an output of the electric motor through the differential device to a pair of drive shafts, and (c) a case housing the electric motor and the transaxle, wherein (d) the case includes a first end surface portion located on the other end side of the electric motor in the motor centerline direction and rotatably supporting the motor shaft, and an accessory component of the vehicle is attached to an outside surface of the first end surface portion.

The accessory component of the vehicle is an auxiliary vehicle-mounted device separated from a mechanical transmission system of a drive power and originally mounted on the vehicle and corresponds to various vehicle-mounted devices such as an electric compressor for an air conditioner, an oil cooler, a valve body, and an electronic controller such as a PCU (power control unit) controlling the electric motor, for example.

A second aspect of the present disclosure provides the electric vehicle according to the first aspect of the present disclosure, wherein the accessory component is attached to the first end surface portion such that the gravity center of the accessory component is located at a position offset from the motor centerline.

A third aspect of the present disclosure provides the electric vehicle according to the first or second aspect of the present disclosure, wherein the accessory component, is attached to the first end surface portion via an attachment member such that the accessory component is separated from the first end surface portion.

A fourth aspect of the present disclosure provides the electric vehicle according to the third aspect of the present disclosure, wherein (a) the electric drive unit is mounted on a front-side portion of the vehicle in a posture in which the motor centerline is parallel to a vehicle width direction, wherein (b) the accessory component is attached to the first end surface portion via the attachment member such that the accessory component protrudes from the electric drive unit in the vehicle width direction, and wherein (c) the attachment member has a strength set such that when a collision load is applied to the accessory component from the vehicle front side, the attachment member is deformed or broken before any one of the accessory component and the first end surface portion.

A fifth aspect of the present disclosure provides the electric vehicle according to the fourth aspect of the present disclosure, wherein the accessory component is a high-voltage electric component which works on a high voltage of AC 30 V or more and is grounded by an earth cable of the high-voltage electric component connected to a vehicle body.

A sixth aspect of the present disclosure provides the electric vehicle according to any one of the first to fifth aspects of the present disclosure, wherein an elastic member is interposed between the accessory component and the first end surface portion.

A seventh aspect of the present disclosure provides the electric vehicle according to any one of the first to sixth aspects of the present disclosure, wherein the accessory component is a component generating vibration by itself.

An eighth aspect of the present disclosure provides the electric vehicle according to anyone of the first to seventh aspects of the present disclosure, wherein (a) the differential device is disposed on a second axis parallel to the motor centerline, wherein (b) the transaxle includes a gear type power transmission mechanism transmitting an output of the electric motor to the differential device, and wherein (c) the electric drive unit is mounted on the vehicle in a posture in which the motor centerline is parallel to the vehicle width direction.

A ninth aspect of the present disclosure provides the electric vehicle according to any one of the first to eighth aspects of the present disclosure, wherein the electric drive unit includes only the electric motor as the drive power source.

In the electric vehicle as described above, since the accessory component originally disposed in the vehicle is attached to the first end surface portion located on the other end side of the electric motor, i.e., on the side opposite to a coupling portion of the transaxle in the direction of the motor centerline in the case, the accessory component functions as a mass damper so that the force (vibration) due to the motor torque fluctuation and the meshing vibration can be damped to improve the NV performance while avoiding increases in size and weight of the case. Particularly, the displacement of the motor shaft is limited (restricted) by the differential device etc. on the side of the coupling portion of the transaxle, and therefore, the vibration tends to increase on the side of the first end surface portion opposite thereto, and since the accessory component is attached to the first end surface portion, the vibration of the case can effectively be damped as compared to when the accessory component is arranged on the outer circumferential surface of the case as in the conventional technique.

In the second aspect of the present disclosure, the accessory component is attached to the first end surface portion so that the gravity center of the accessory component is offset from the motor centerline. In this case, since the moment is generated by the accessory component around the motor centerline, circumferential vibrations around the motor centerline can effectively be damped.

In the third aspect of the present disclosure, the accessory component is mounted such that the component is separated (floated) from the first end surface portion via the attachment member. Therefore, the gravity center of the accessory component is located at a position separated from the first end surface portion in the motor centerline direction, and the moment about the coupling portion of the transaxle becomes larger so that a vibration or swing in a direction (radial direction) perpendicular to the motor centerline can more effectively be damped.

In the fourth aspect of the present disclosure, the electric drive unit is mounted on the front-side portion of the vehicle in a posture in which the motor centerline is parallel to the vehicle width direction, the accessory component is attached to the first end surface portion via the attachment member such that the accessory component protrudes from the electric drive unit in the vehicle width direction, and the strength of the attachment member is set such that when the collision load is applied to the accessory component from the vehicle front side, the attachment member is deformed or broken before any one of the accessory component and the first end surface portion. Therefore, the collision load applied to the accessory component and/or the case is reduced by the deformation or breakage of the attachment member, which suppresses damage(s) of the accessory component, the case, and/or the electric motor etc. disposed inside the case. Since the electric motor used as a drive power source of the electric vehicle generally operates with high voltage, the suppression of damage to the electric motor and/or related electric components leads to improvement in safety performance against high voltage.

In the case of the fifth aspect of the present disclosure, the accessory component attached to the first end surface portion of the case is a high-voltage electric component such as an electric compressor and an inverter, and since deformation or breakage of the attachment member suppresses damage of the electric motor in the case as well as the high voltage electric component outside the case, the safety performance against high voltage is properly ensured. Since the earth cable of the high-voltage electric component is connected to the vehicle body, even if the attachment member is broken, the high-voltage electric component can conveniently be prevented from falling off from the vehicle body by using the originally necessary earth cable.

In the sixth aspect of the present disclosure, the elastic body is interposed between the accessory component and the first end surface portion. Therefore, a dynamic damper effect of damping the vibration of the case can be expected due to the accessory component which is vibrated via the elastic body.

In the case of the seventh aspect of the present disclosure, the accessory component itself generates vibration (force) or, for example, art electric compressor for an air conditioner includes a moving component inside, and the electric drive unit functions as a mass, damper for the force and also functions as a dynamic damper if an elastic body is interposed. Therefore, the electric drive unit and the accessory component can function as dampers to cancel and damp the forces each other.

DESCRIPTION OF THE EMBODIMENTS

The present disclosure is applied to an electric vehicle having only an electric motor as a drive power source and may also be applied to a parallel or series hybrid electric Vehicle having an electric motor and an engine (internal combustion engine) as a drive power source. The electric vehicle may run by using only a vehicle-mounted battery as an electric power source or may be equipped with an electric power generating device such as a fuel cell. Although a synchronous motor is used for the electric motor, an AC motor such as an induction motor and a direct current (DC) motor can also be employed. In some embodiments, a motor generator also functioning as an electric generator is used.

The present disclosure is applied to a transversely-mounted electric drive unit mounted on a vehicle in a posture in which a differential device is disposed on a second axis parallel to a motor centerline while the motor centerline is parallel to a vehicle width direction and may also be applied to a transversely-mounted electric drive unit in which a differential device is disposed on the motor centerline with a drive shaft inserted through the inside of a hollow motor shaft. When the drive shaft is inserted through the inside of the motor shaft, an accessory component is attached to, for example, a circumferential edge portion offset from the motor centerline so as not to interfere with the drive shaft. These transversely-mounted electric drive units are used in both a front-wheel drive vehicle of a front-mounted drive power source type in which the units are disposed on the front side of the vehicle to drive front wheels and a rear-wheel drive vehicle of a rear-mounted drive power source type in which the units are disposed on the rear side of the vehicle to drive rear wheels. The vehicle can be configured such that the front and rear wheels are driven by using a transfer. The present disclosure is also applicable to an electric drive unit of a longitudinally-mounted type (i.e. an electric drive unit in which the electric motor is set such that the motor centerline coincides in a vehicle front-rear direction) in which the differential device is disposed orthogonally to the motor centerline in a planar view from above the vehicle. In some embodiments, a bevel gear type or planetary gear type differential device is used.

A transaxle is disposed on one end side (opposite to a first end surface portion) of the electric motor in the motor centerline direction, for example, and is coupled to the motor shaft via a gear(s) etc. to transmit power to the differential device disposed on the one end side; however, the differential device itself may not necessarily be arranged on the one end side and can be arranged at a position overlapping the electric motor in the motor centerline direction. The transaxle is configured to include a gear type power transmission mechanism, for example. The power transmission mechanism is a speed reducing mechanism or a speed increasing mechanism of a parallel shaft type, a planetary gear type, etc., and can establish multiple gear positions different in transmission ratio with engagement devices such as clutches and brakes.

Although the accessory component of the vehicle is attached to the first end surface portion located at the other end side of the electric motor at least in the motor centerline direction, an accessory component can further be attached to a second end surface portion on the one end side of the electric motor, i.e., on the side of a coupling portion to the transaxle, to damp the force. Alternatively, the accessory component can be attached to the outer circumferential surface of the case as in the conventional technique.

The accessory component is attached to the first end surface portion such that the component is separated from the first end surface portion in the motor centerline direction via an attachment member (such that the component is at least partially floated with a space interposed therebetween) or the like may be attached via the attachment member such that a surface of the component on the side facing the first end surface portion substantially entirely comes into close contact with the first end surface portion. If the accessory component is attached to the first end surface portion of the transversely-mounted electric drive unit the motor centerline of which substantially parallel to the vehicle width direction via the attachment member such that the accessory component projects from the electric drive unit in the vehicle width direction, and the electric drive unit is mounted on a vehicle front-side portion, the strength of the attachment member is desirably determined such that, for example, when a collision load applied from the vehicle front side to the accessory component due to an offset collision i.e. partial collision of the vehicle front side with other vehicle or objects deviated from the front of the vehicle, the attachment member is deformed or broken before any one of the accessory component and the first end surface portion. For example, the material, shape, thickness, etc. of the attachment member are set such that the strength of the attachment member becomes lower than the strength of both attachment positions of the accessory component and the first end surface portion to which the attachment member is fixedly attached. Specifically, for example, when the attachment member has a case attachment portion on the vehicle rear side fixed to the outside surface of the first end surface portion and an accessory attachment portion on the vehicle front side disposed integrally with the case attachment portion to extend/from the case attachment portion to the vehicle front side (the input side of the collision load) such that the accessory attachment portion is shifted in the motor centerline direction away from the first end surface portion, and the accessory component is fixed to the accessory attachment portion, the accessory component is supported in a cantilever state, such that a gap exists between the accessory component and the first end surface portion, and thus, the attachment member is relatively easily deformed or broken due to the collision load from the vehicle front side. In the case of the transversely-mounted electric drive unit mounted on the vehicle rear-side portion, the strength of the attachment member is desirably set as described above such that when the collision load is applied from the vehicle rear side to the accessory component, the attachment member is deformed or broken before any one of the accessory component and the first end surface portion.

In the case of an electric vehicle, a high voltage electric motor which works on a high, voltage such as AC 30 (V) or more, for example, AC 100 (V) or more, furthermore AC 300 (V) or more, is used as a drive power source, and it is known that accessory components include high-voltage electric components which work on a high voltage at the same level as the electric motor, such as an electric compressor for an air conditioner, and an electronic control unit such as an inverter. Some high-voltage electric components work on a high voltage of AC 30 (V) or more regardless of the voltage on which the electric motor works. If such a high-voltage electric component is attached to the case of the electric drive unit, the strength of the attachment member is desirably set relatively low so as to ensure safety performance against high voltage. However, when the present disclosure is implemented for the purpose of improving the NV performance, the strength of the attachment member may not necessarily be made relatively low as described above. For example, if an electric component which works on a low voltage lower than AC 30 (V), or an accessory component, other than the electric component, such as an oil cooler, is attached to the case of the electric drive unit, the attachment member having the strength lower than the case of the electric drive unit and at the same level, as or higher than the accessory component can be employed for suppressing the damage of the electric motor, and other various forms are available. An earth cable of the high-voltage electric component can be connected to a vehicle body such as a frame or a crossmember to prevent falling-off etc. of the high-voltage electric component in the case of breakage of the attachment member, and even if the high-voltage electric component is directly fixed to the first end surface portion without using the attachment member, the earth cable can be connected to the vehicle body to prevent falling-off etc. of the high-voltage electric component. If the case of the electric drive unit has a relatively high strength etc., the earth cable can be coupled to a member other than the vehicle body such as a case for grounding.

EXAMPLES

Examples of the present disclosure will now be described in detail with reference to the drawings. In the following examples, the figures are simplified or deformed as needed for description, and portions are not necessarily precisely drawn in terms of dimension ratio, shape, etc.

Figure 1:
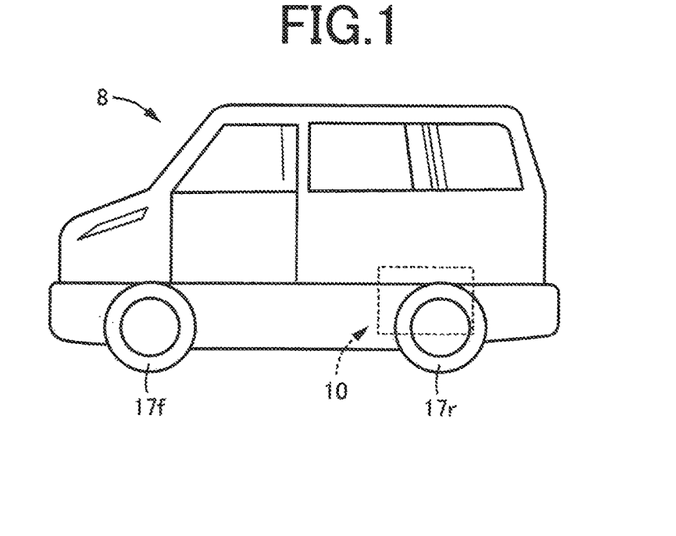
FIG. 1 is a schematic left side view of an electric vehicle of a rear-mounted drive power source type that is an example of the present disclosure as viewed from the vehicle left side.
Figure 2:
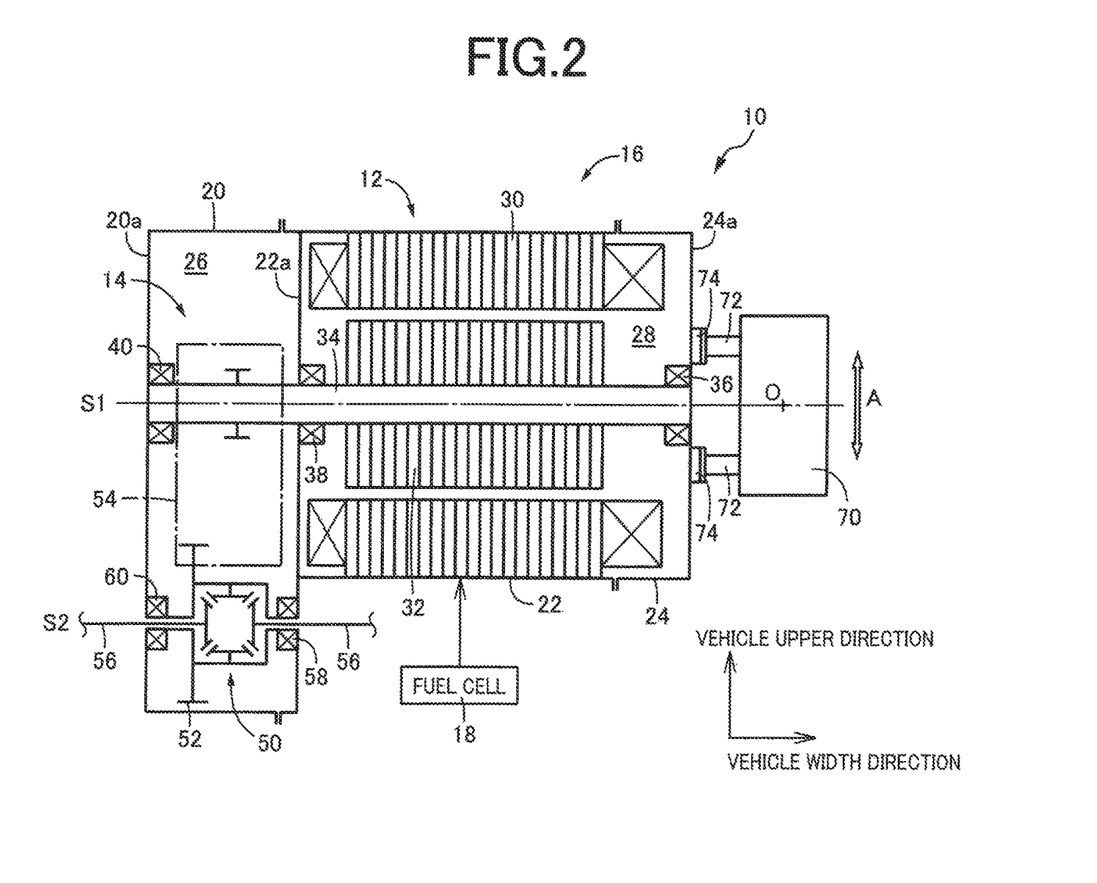
FIG. 2 is a cross-sectional view for explaining a schematic configuration of an electric drive unit mounted on the electric vehicle of FIG. 1, also showing an accessory component attached to a case.
Figure 3:
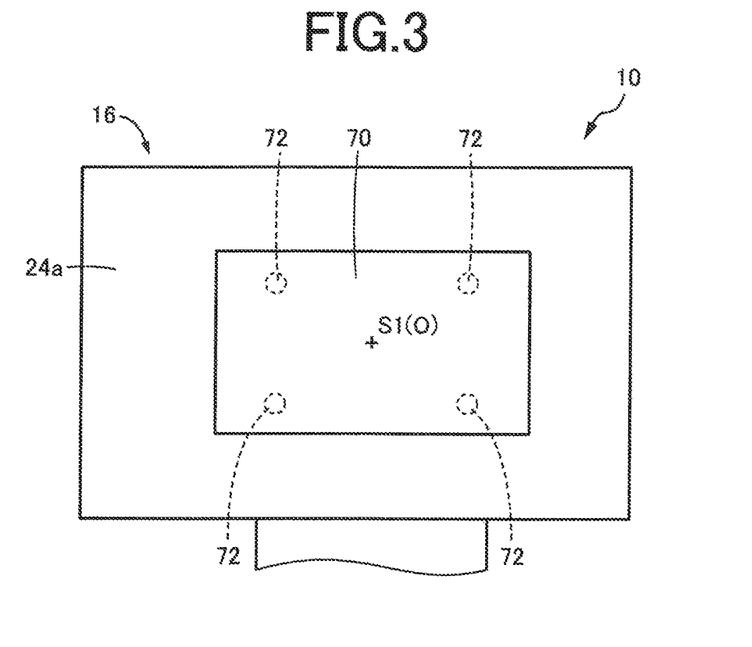
FIG. 3 is a right side view of the electric drive unit of FIG. 2 as viewed from the accessory component side.
Figure 4:
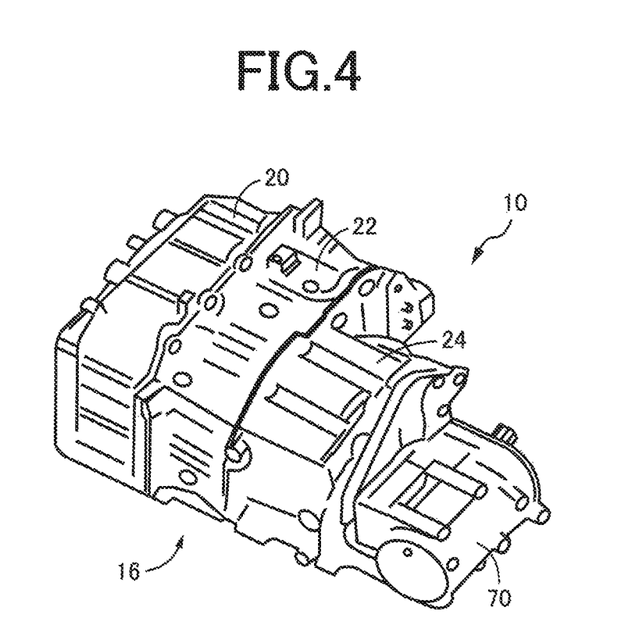
FIG. 4 is a schematic perspective view of a specific example of the electric drive unit to which the accessory component is attached.

FIG. 1 is a schematic left side view of an electric vehicle 8 that is an example of the present disclosure as viewed from the left side. FIG. 2 is a cross-sectional view for explaining a general configuration of an electric drive unit 10 mounted on the electric vehicle 8, and FIG. 3 is a right side view of the electric drive unit 10 as viewed in a direction from the right of FIG. 2. FIG. 4 is a schematic perspective view of an actual external shape of the electric drive unit 10. The electric drive unit 10 includes a motor generator 12 disposed on a first axis S1 and used as a drive power source, a transaxle 14 adjacently disposed on one end side of the motor generator 12 side-by-side in the first axis S1 direction, and a case 16 housing the motor generator 12 and the transaxle 14. The electric drive unit 10 is a transversely-mounted unit mounted on the electric vehicle 8 in such a posture that the first axis S1 is parallel to the vehicle width direction, and the unit 10 is disposed in a rear-side portion of the electric vehicle 8 to rotationally drive rear wheels 17r. Therefore, the electric vehicle 8 of this example is a rear-wheel drive vehicle of a rear-mounted drive power source type in which the electric drive unit 10 is arranged in the vehicle rear-side portion to rotationally drive the rear wheels 17r for running. The electric drive unit 10 of this example is also applicable to a front-wheel driven vehicle of a front-mounted drive power source type in which the unit 10 is arranged in a vehicle front-side portion to rotationally driven left and right front wheels 17f for running.

The electric vehicle 8 is a fuel cell type electric vehicle including a single motor generator 12 only as a drive power source, and, for example, electric power is supplied at a high-voltage of about AC 650 (V) from a fuel cell 18 mounted on the electric vehicle 8 and a battery not shown through an electronic control unit such as an inverter. However, the present disclosure can be applied to an electric vehicle without the fuel cell 18 in which the electric power can be supplied only from a battery, or a series hybrid electric vehicle including an electric generator rotationally driven by an engine as an electric power source instead of the fuel cell 18. The electric vehicle 8 corresponds to an electric vehicle, the motor generator 12 selectively functions as an electric motor and an electric generator and corresponds, to an electric motor, and the first axis S1 corresponds to a motor centerline.

The case 16 includes a bottomed cylindrical gear case portion 20 housing the transaxle 14, a cylindrical motor case portion 22 housing the motor generator 12, and a bottomed cylindrical cover portion 24. The motor case portion 22 is integrally provided with a partition plate 22a extending toward the inner circumferential side, and one opening portion of the motor case portion 22 is integrally coupled to an opening portion of the gear case portion 20 by bolts etc., so that a gear housing space 26 is formed between, the gear case portion 20 and the partition plate 22a with the transaxle 14 housed in the gear housing space 26. An opening portion of the cover portion 24 is integrally coupled to the other opening portion of the motor case portion 22 by bolts etc., so that a motor housing space 28 housing the motor generator 12 is formed therein. A bottom portion 24a of the cover portion 24 corresponds to a first end surface portion located on the side opposite to the transaxle 14 in the first axis S1 direction, i.e., the other end side of the motor generator 12, and a bottom portion 20a of the gear case portion 20 corresponds to a second end surface portion located on one end side of the motor generator 12 in the first axis S1 direction.

The motor generator 12 is a synchronous motor and includes a stator 30 and a rotor 32 having an annular shape respectively, and concentric with the first axis S1, and the rotor 32 has a diameter smaller than the stator 30 and is disposed inside the stator 30 with a motor shaft 34 fixedly disposed in a center portion of the rotor 32. The stator 30 is provided with comb teeth so that a number of coils are wound therearound, and the coils are projected at both end portions in directions of the first axis S1 by different projecting dimensions such that, in this example, the projecting dimension becomes larger toward the cover portion 24 (in the direction to the right of FIG. 2), making the weight heavy on the side of the cover portion 24. However, the projecting dimensions of the coils at both end portions can be made substantially equal to each other to make the weight substantially the same. The motor shaft 34 is made up of multiple members coupled by spline coupling etc. as needed. The stator 30 is integrally fixed to the inside of the motor case portion 22 by press fitting etc., while the motor shaft 34 is rotatably supported by the case 16 around an axial center coincident with the first axis S1 via three sets of bearings 36,

38, 40. The bearing 36 is disposed on the bottom portion 24*a* of the cover portion 24 to rotatably support an end portion of the motor shaft 34; the beating 38 is disposed on the partition plate 22*a* to rotatably support an intermediate portion of the motor shaft 34; and the bearing 40 is disposed on the bottom portion 20*a* of the gear case portion 20 to rotatably support an end portion of the motor shaft 34.

The transaxle 14 includes a differential device 50 disposed on a second axis S2 parallel to the first axis S1, and a power transmission mechanism 54 transmitting power between the motor shaft 34 of the motor generator 12 and a ring gear 52 of the differential device 50. The power transmission mechanism 54 is a parallel shaft type or planetary gear type reduction gear mechanism reducing a rotation speed of the motor shaft 34 before transmission of the rotation of the motor shaft 34 to the differential device 50, for example. The differential device 50 is a bevel gear type differential mechanism aid transmits the power transmitted to the ring gear 52, from a pair of side gears through a constant velocity joint etc. to a pair of left and right drive shafts 56. As a result, the left and right rear wheels 17*r* are rotationally driven. The differential device 50 is rotatably supported by the case 16 around the second axis S2 via a pair of bearings 58, 60.

The electric drive unit 10 as described above is disposed on a vehicle body via a rubber mount etc.; however, when a force (vibration) caused by a vibration source such as a torque fluctuation of the motor generator 12 and a meshing vibration of gears is transmitted from the motor shaft 34 through the bearings 36, 38, 40 to the case 16 and further propagated from the case 16 through the air, sound may be generated as motor noise or gear noise, deteriorating NV performance in the vehicle interior during acceleration/deceleration. Vibration may also be transmitted from the bearings 58, 60 rotatably supporting the differential device 50 to the case 16, which possibly deteriorates the NV performance. The torque fluctuation of the motor generator 12 is fluctuation in output torque for running or regenerative torque, for example, and generates vibration at a frequency corresponding to the number of poles of the motor generator 12. The meshing vibration is vibration in the rotational direction of gears generated due to a gear meshing error etc. or vibration in the axial direction of helical gears generated during rotation of the gears and is generally generated as vibration at a frequency corresponding to a rotational speed of the gears.

In this regard, in this example, an accessory component 70 of the vehicle is attached to an outside surface of the bottom portion 24*a* on the side opposite to the transaxle 14, i.e., the side close to the motor generator 12, out of the bottom portions 20*a*, 24*a* forming a pair of end surface portions located at both end portions of the case 16 in the first axis S1 direction. In this example, an electric compressor for an air conditioner is fixed as the accessory component 70 to the bottom portion 24*a* such that the component 70 is separated (floated) from the bottom portion 24*a* via multiple (in the example, four) attachment members 72 while a gravity center O of the accessory component 70 is located on the first axis S1. The position and the number of the attachment members 72 are appropriately determined. An elastic body (elastic member) 74 such as a rubber block or a rubber bush is interposed between each of the multiple attachment members 72 and the bottom portion 24*a*. The multiple attachment members 72 are fixed to the bottom portion 24*a* by bolts etc. not shown such that the elastic body 74 is elastically deformed to achieve a predefined rigidity according to a vehicle type etc. The rigidity of the elastic body 74 can be adjusted according to a fastening torque of bolts etc.

In the electric vehicle 8 of this example as described above, since the accessory component 70 originally disposed in the vehicle is attached to the outside surface of the bottom portion 24*a* located on the side opposite to a coupling portion of the transaxle 14 across the motor generator 12 in the direction of the first axis S1 that is the motor centerline in the case 16 of the electric drive unit 10, the accessory component 70 functions as a mass damper so that the force (vibration) due to the motor torque fluctuation and the meshing vibration can be damped to improve the NV performance while avoiding increases in size and weight of the case 16. Particularly, the displacement of the motor shaft 34 is limited (restricted) by the differential device 50 etc. on the side of the coupling portion of the transaxle 14, and therefore the vibration tends to increase on the side of the bottom portion 24*a* opposite thereto, and since the accessory component 70 is attached to the bottom portion 24*a*, the vibration of the case 16 can effectively be damped as compared to when the accessory component is arranged on the outer circumferential surface of the case as in the conventional technique.

Since the accessory component 70 is mounted such that the component 70 is separated (floated) from the bottom portion 24*a* via the attachment member 72, the gravity center O of the accessory component 70 is located at a position separated from the bottom portion 24*a* in the first axis S1 direction, and the moment about die coupling portion of the transaxle 14 becomes larger so that a vibration or swing A (see. FIG. 2) in a direction (radial direction) perpendicular to the first axis S1 can more effectively be damped.

Since the elastic body 74 is interposed between the accessory component 70 and the bottom portion 24*a*, a dynamic damper effect of damping the vibration of the case 16 can be expected due to the accessory component 70 which is vibrated via the elastic body 74.

Since the accessory component 70 in the form of the electric compressor is attached to the bottom portion 24*a* and the accessory component 70 itself generates a force (vibration) due to an internal moving component (such as a rotating body), the electric drive unit 10 functions as a mass damper and a dynamic damper for the force. Therefore, the electric drive unit 10 and the accessory component 70 can function as dampers to cancel and damp the forces each other.

Other examples of the present disclosure will be described. In the following examples, the portions substantially common to the example described above are denoted by the same reference numerals and will not be described in detail.

Figure 5:
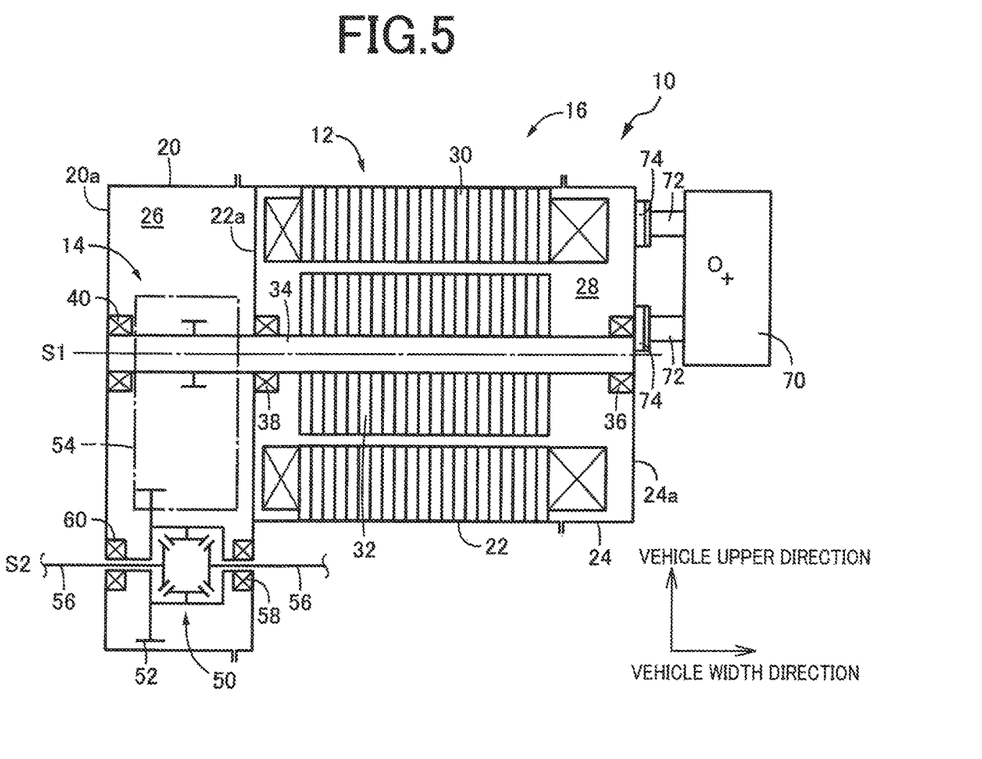
FIG. 5 is a cross-sectional view corresponding to FIG. 2 for explaining another example different in attachment of the accessory component to the electric drive unit.
Figure 6:
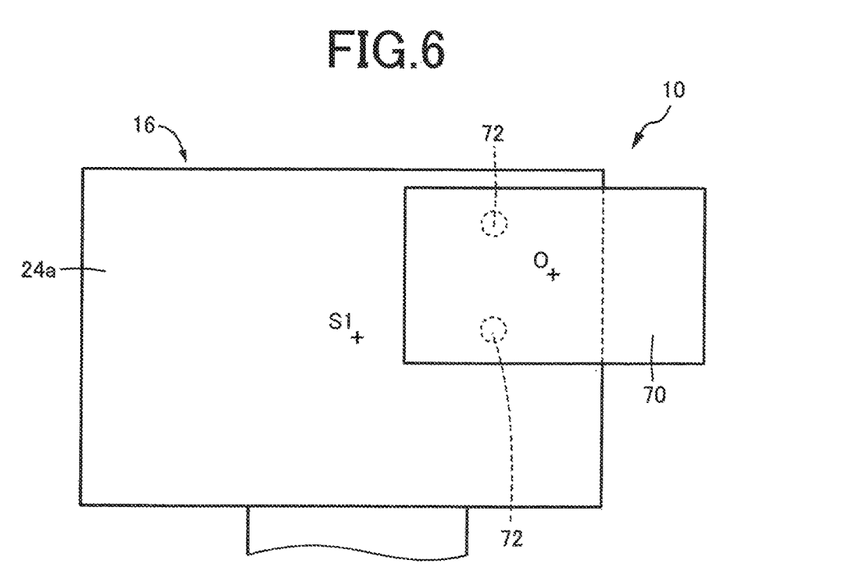
FIG. 6 is a right side view of the electric drive unit of FIG. 5 as viewed from the accessory component side.

FIGS. 5 and 6 are across-sectional view of the electric drive unit 10 and a right side view thereof corresponding to FIGS. 2 and 3, respectively. In this example, the accessory component 70 is attached to the bottom portion 24*a* via a pair of the attachment members 72 such that the gravity center O of the accessory component 70 is offset from the first axis S1 that is the motor centerline. In this case, since the moment is generated by the accessory component 70 around the first axis S1, i.e., around the motor centerline, circumferential vibrations around the motor centerline can effectively be damped. The disposed position of the accessory component 70 and the number of the attachment members 72 can arbitrarily be set around the first axis S1.

Figure 7:
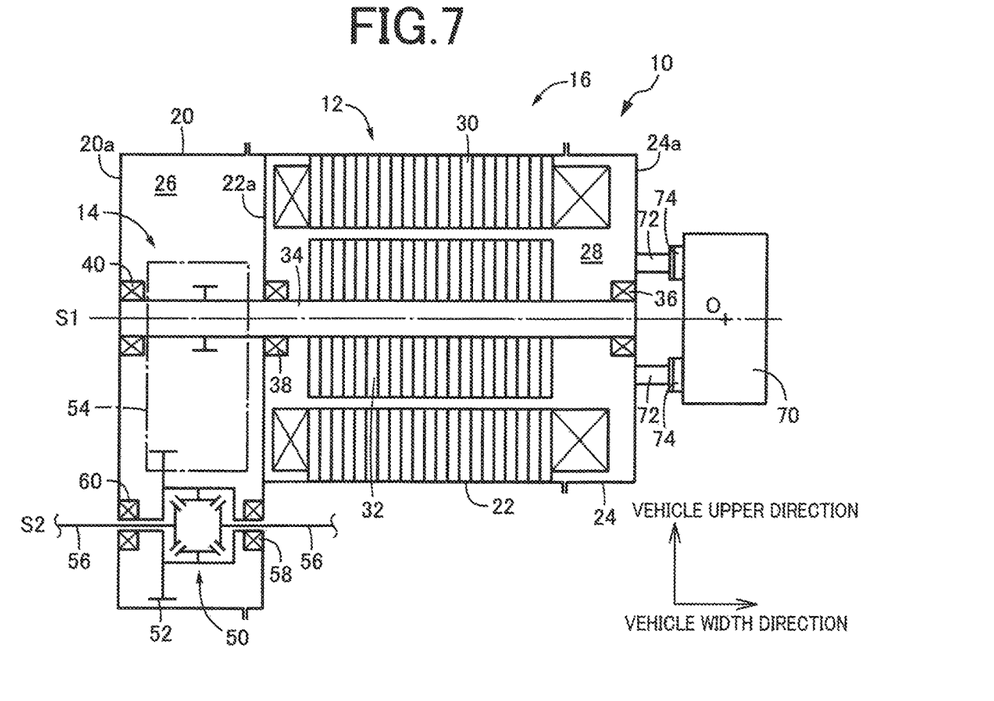
FIG. 7 is a cross-sectional view corresponding to FIG. 2 for explaining still another example different in attachment of the accessory component to the electric drive unit.

FIG. 7 is a cross-sectional view of the electric drive unit 10 corresponding to FIG. 2. This example is different from the example of FIG. 2 in that the elastic body 74 is interposed between each of the multiple attachment members 72 and the accessory component 70. In this case, substantially the same effects as the example of FIG. 2 can be acquired.

Figure 8:
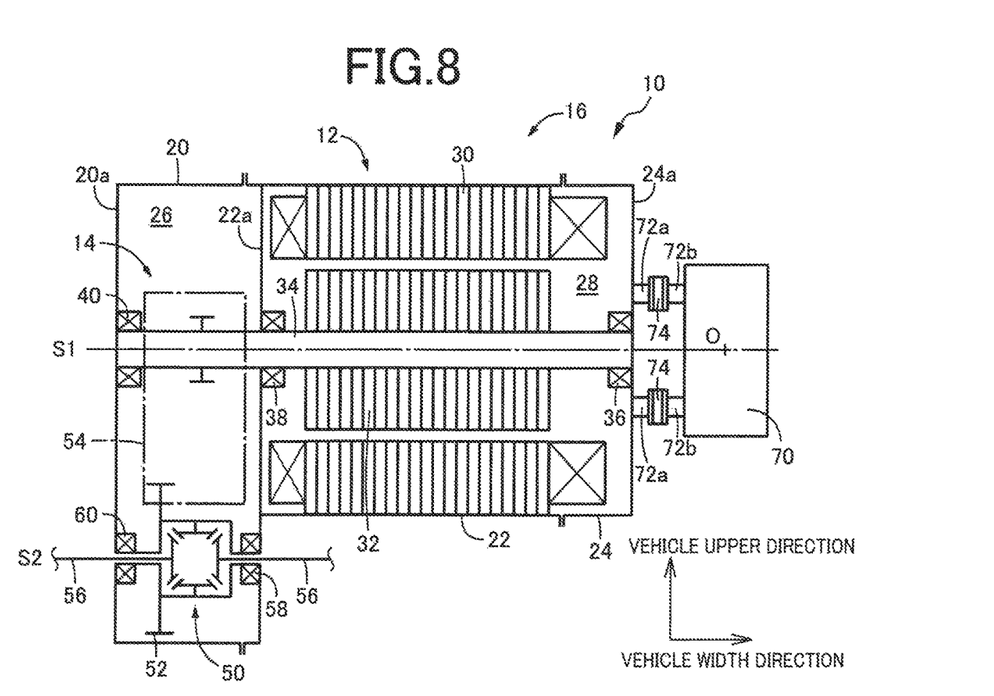
FIG. 8 is a cross-sectional view corresponding to FIG. 2 for explaining still another example different in attachment of the accessory component to the electric drive unit.

FIG. 8 is a cross-sectional view corresponding to FIG. 2. This example is different from the example of FIG. 2 in that the multiple attachment members 72 are each divided into two pieces 72a and 72b with the elastic body 74 interposed in an intermediate portion thereof. In this case, substantially the same effects as the example of FIG. 2 can be acquired.

Figure 9:
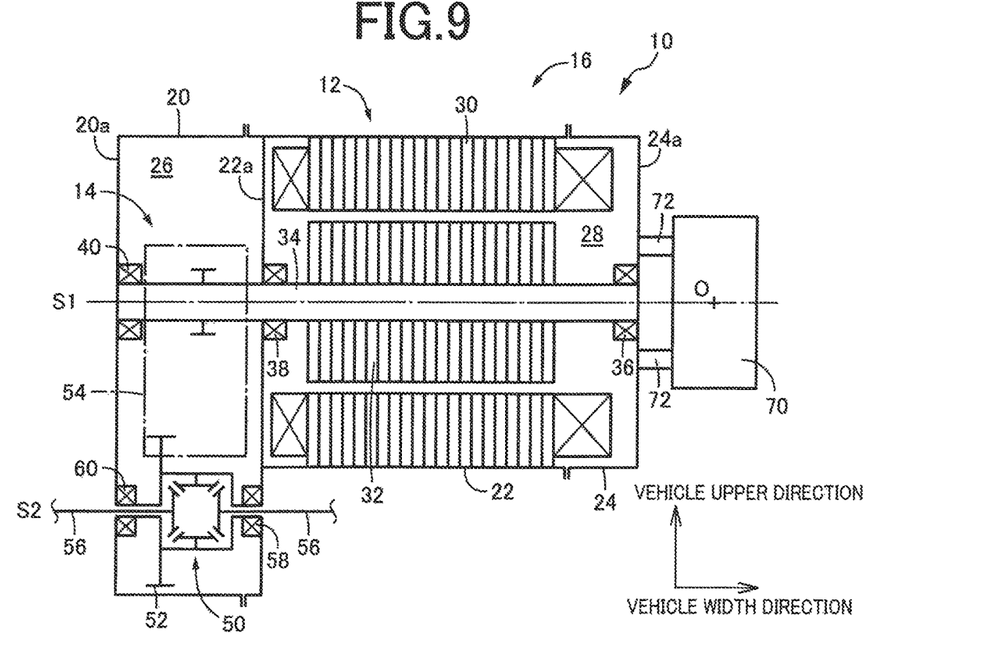
FIG. 9 is a cross-sectional view corresponding to FIG. 2 for explaining still another example different in attachment of the accessory component to the electric drive unit.

FIG. 9 is a cross-sectional view corresponding to FIG. 2. This example is different from the example of FIG. 2 in that the accessory component 70 is attached to the bottom portion 24a via the multiple attachment members 72 without interposing the elastic body 74. In this case, the same effects as the example of FIG. 2 can be acquired except that the function of the dynamic damper cannot be acquired from the elastic body 74.

Figure 10:
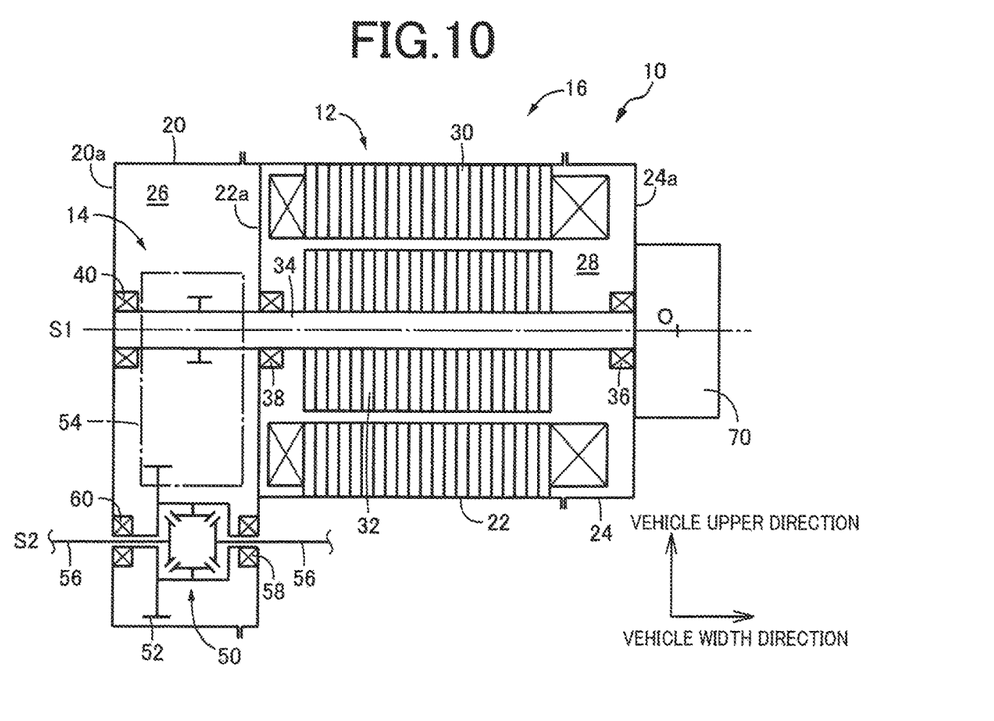
FIG. 10 is a cross-sectional view corresponding to FIG. 2 for explaining still another example different in attachment of the accessory component to the electric drive unit.

FIG. 10 is a cross-sectional view corresponding to FIG. 2. This example is different from the example of FIG. 2 in that the accessory component 70 is directly attached to the bottom portion 24a without interposing the attachment member 72 and the elastic body 74. Specifically, depending on the shape of the bottom portion 24a, the accessory component 70 can directly be attached to the bottom portion 24a, and a damper effect can be acquired from the accessory component 70. Even in this case, the elastic body 74 can be interposed between the bottom portion 24a and the accessory component 70 as needed.

The example with the gravity center O of the accessory component 70 offset from the first axis S1 as shown in FIGS. 5 and 6 can also be implemented in the same form as FIGS. 7 to 10.

Figure 11:
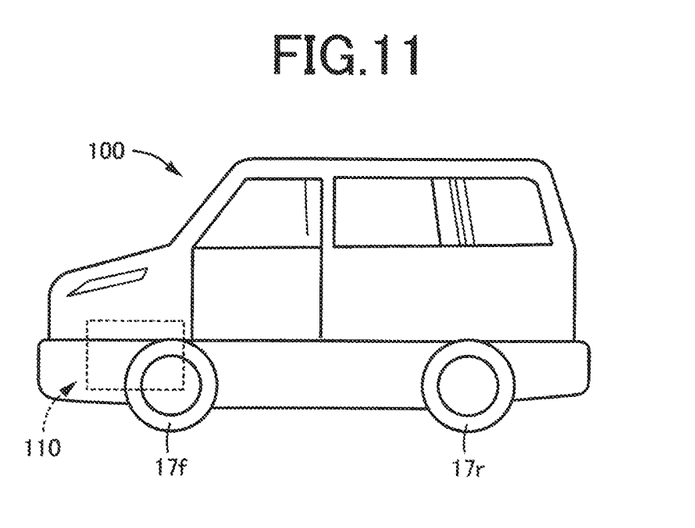
FIG. 11 is a view for explaining still another example of the present disclosure and is a schematic left side view of an electric vehicle of a front-mounted drive power source type as viewed from the vehicle left side.

FIGS. 11 to 17 are views for explaining yet another example of the present disclosure. FIG. 11 is a view of ail electric vehicle 100 corresponding to FIG. 1 and is a schematic left side view of the electric vehicle 100. The electric vehicle 100 is a front-wheel drive vehicle of a front-mounted drive power source type in which an electric drive unit 110 is mounted on the vehicle front-side portion to rotationally drive the left and right front wheels 17f for running. The electric drive unit 110 is configured in substantially the same manner as the electric drive unit 10 shown in FIG. 2 and includes the motor generator 12, the transaxle 14, the case 16, etc.

Figure 12:
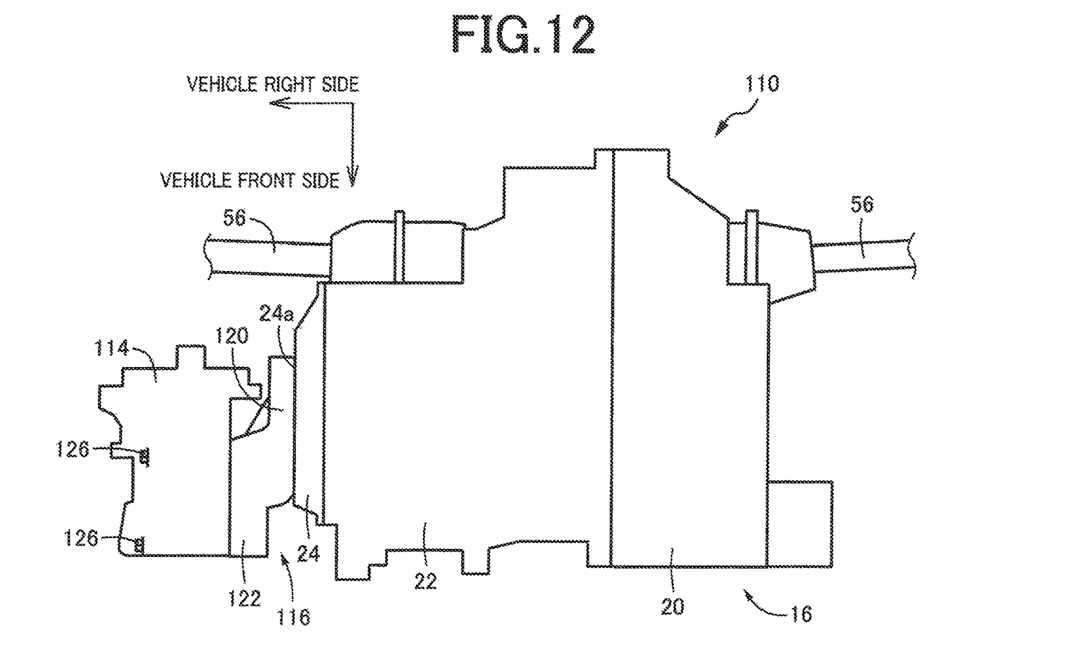
FIG. 12 is a schematic plane view of an electric drive unit mounted on the electric vehicle of FIG. 11, also showing an accessory component (electric compressor)
Figure 13:
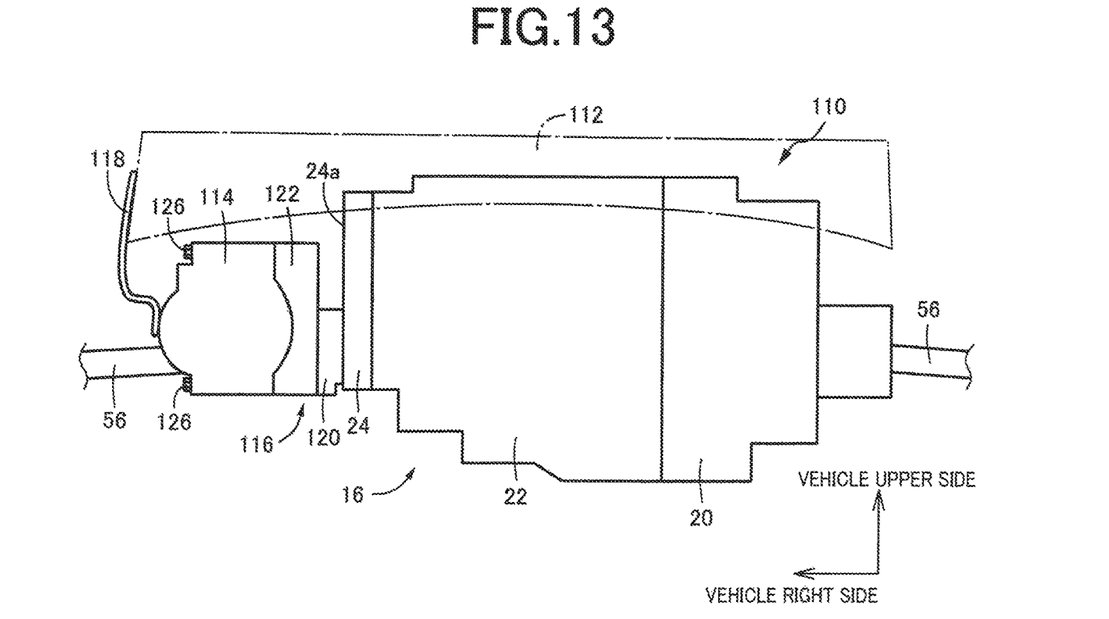
FIG. 13 is a schematic front view of the electric drive unit to which the accessory component of FIG. 12 is attached as viewed from the vehicle front side.
Figure 14:
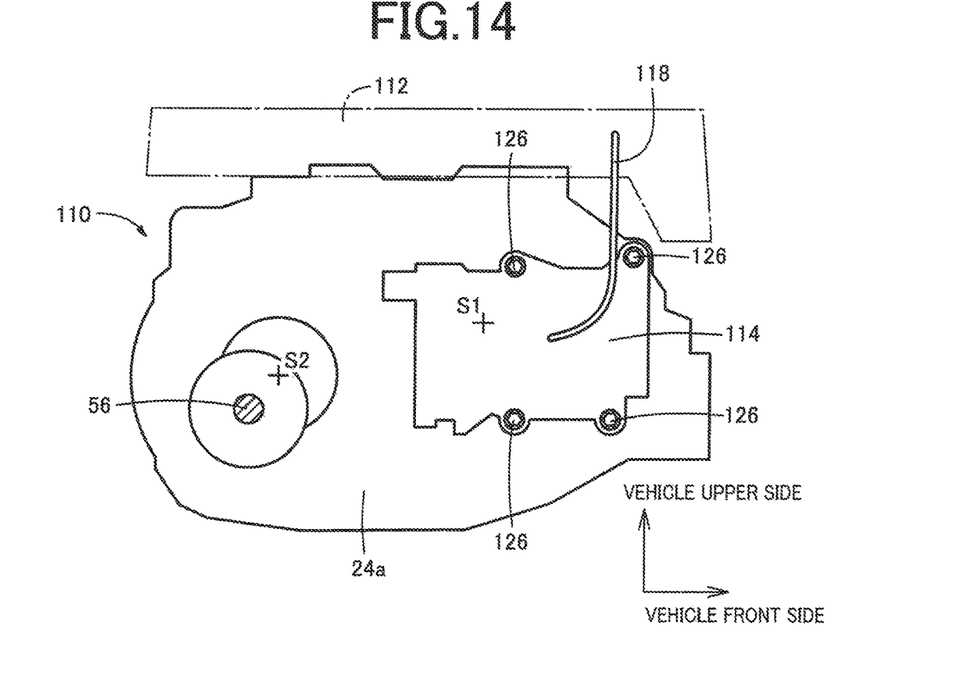
FIG. 14 is a schematic right side view of the electric drive unit to which the accessory component of FIG. 12 is attached as viewed from the vehicle right side.

FIG. 12 is a schematic plane view of the electric drive unit 110 from the vehicle upper side. FIG. 13 is a schematic front view of the electric drive unit 110 from the vehicle front side, and FIG. 14 is a schematic right side view of the electric drive unit 110 from the vehicle right side. In these figures, the electric drive unit 110 is attached via a mount etc. to and supported by an upper-side crossmember 112 disposed along the vehicle width direction on the vehicle upper side of the electric drive unit 110. Additionally, to the bottom portion 24a of the cover portion 24 that is a first end surface portion of the electric drive unit 110, i.e., an end surface portion on the vehicle right side of the case 16 in this example, an electric compressor 114 for an air conditioner is attached as an accessory component by using an attachment bracket 116 in a projecting manner toward the right side of the vehicle. The electric compressor 114 is a high-voltage electric compressor operated at the same high voltage of AC 650 V as the motor generator 12 and has an earth cable 118 coupled to the upper-side crossmember 112 for grounding.

The upper-side crossmember 112 corresponds to a vehicle body, the electric compressor 114 corresponds to a high-voltage electric component, and the attachment bracket 116 corresponds to an attachment member. The gear case portion 20 and the motor case portion 22 of the case 16 may each further be divided into multiple members as needed.

Figure 15:
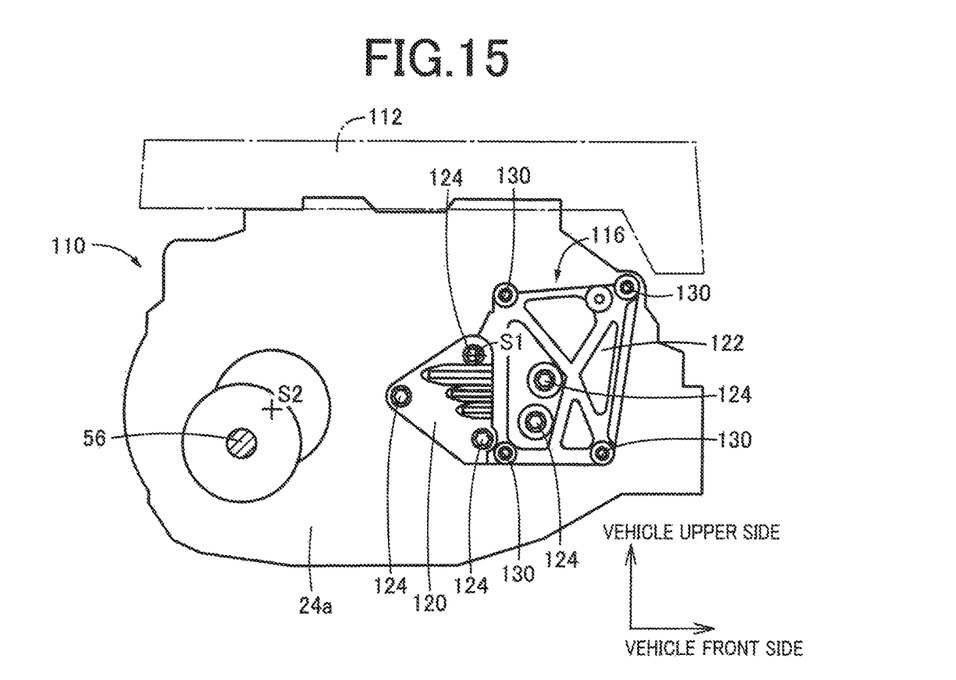
FIG. 15 is a schematic right side view of the electric drive unit when the accessory component is removed from an attachment bracket in FIG. 14.
Figure 16:
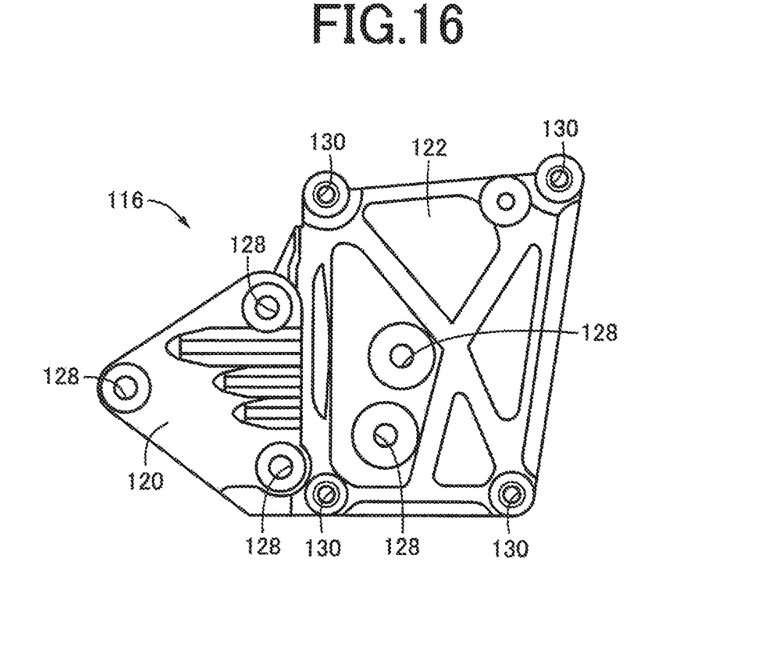
FIG. 16 is a schematic front view showing only the attachment bracket as viewed in the same direction as FIG. 15.
Figure 17:
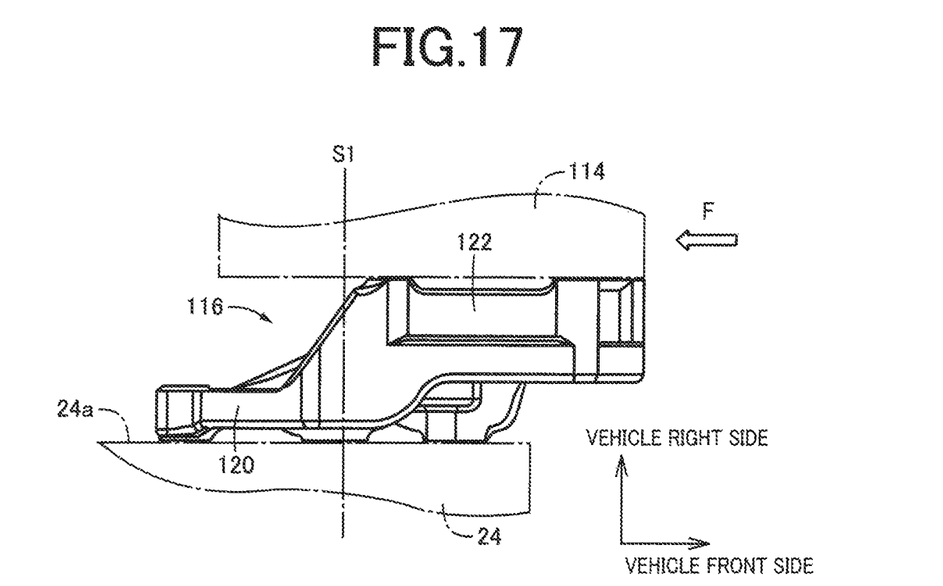
FIG. 17 is a schematic bottom view of the attachment bracket of FIG. 16 as viewed from below, also showing an attachment state of the accessory component to the case of the electric drive unit.

FIG. 15 is a schematic right side view of the electric drive unit 110 when the electric compressor 14 is removed from the attachment bracket 116 in FIG. 14, and FIG. 16 is a schematic front view showing only the attachment bracket 116 as viewed in the same direction as FIG. 15. FIG. 17 is a schematic bottom view of the attachment bracket 116 of FIG. 16 as viewed from below, also showing an attachment state of the electric compressor 114 to the cover portion 24 of the case 16. The attachment bracket 116 is made of a metal material such as aluminum casting and has a case attachment portion 120 on the vehicle rear side fixed to the outside surface of the bottom portion 24a of the cover portion 24 and an accessory attachment portion 122 on the vehicle front side disposed integrally with the case attachment portion 120 to extend from the case attachment portion 120 to the vehicle front side such that the accessory attachment portion 122 is shifted in the first axis S1 direction away from the bottom portion 24a of the cover portion 24, and the electric compressor 114 is fixed to the accessory attachment portion 122. The case attachment portion 120 is fixed to the cover portion 24 by using five bolts 124 as shown in FIG. 15, while the electric compressor 114 is fixed to the accessory attachment portion 122 by using four bolts 126 as shown in FIG. 14. Therefore, the attachment strength of the attachment bracket 116 to the cover portion 24 is made relatively higher than the attachment strength of the electric compressor 114 to the attachment bracket 116. The case attachment/portion 120 of the attachment bracket 116 is provided with five bolt insertion holes 128 through which the bolts 124 are inserted, and the accessory attachment portion 122 of the attachment bracket 116 is provided with four screw holes 130 into which the bolts 126 are screwed. The accessory attachment portion 122 is provided such that a portion of the accessory attachment portion 122 on the vehicle rear side overlaps the case attachment portion 120.

Since the accessory attachment portion 122 of the attachment bracket 116 is separated from the cover portion 24 and the electric compressor 114 is fixed to the accessory attachment portion 122, the electric compressor 114 is supported in a cantilever state, floating from the cover portion 24. As a result, fox example, when a collision load F is applied from the vehicle front side to the electric compressor 114 as shown in FIG. 17 due to an offset collision etc. shifted rightward from the center of the front of the electric vehicle. 100, the attachment bracket 116 is relatively easily deformed or broken. Therefore, the strength of the attachment bracket 116 is determined such that when the collision load F is applied to the electric compressor 114 from the vehicle-front side at the time of a head-on collision etc. of the electric vehicle 100, the attachment bracket 116 is deformed or broken before any one of the electric compressor 114 and the cover portion 24. Specifically, for example, the material, shape, thickness, etc. of the attachment bracket 116 are set such that the strength of the attachment bracket 116 becomes lower than the strength of both attachment positions of the cover portion 24 and the electric compressor 114 to which the attachment bracket 116 is fixedly attached with respect to the collision load F from the vehicle front side.

Even, the electric vehicle 100 as described above provides substantially the same effects as the electric vehicle 8 including the electric drive unit 10. Although the elastic body 74 is not included in this example, the electric compressor 114 is supported in a cantilever manner via the attachment bracket 116, a dynamic damper effect close to that of the elastic body 74 is expected depending on the supporting rigidity thereof.

On the other hand, the electric vehicle 100 of this example is a front-wheel drive vehicle of a front-mounted drive power source type in which the electric drive unit 110 is mounted on the vehicle front-side portion to rotationally drive the left and right front wheels 17f, and the strength of the attachment bracket 116 is set such that when the collision load F is applied from the vehicle front side to the electric compressor 114 disposed to project from the electric drive unit 110 in the vehicle width direction, the attachment bracket 116 is deformed or broken before any one of the electric compressor 114 and the cover portion 24. Therefore, the collision load F applied to the electric compressor 114 and/or the cover portion 24 is reduced by the deformation or breakage of the attachment bracket 116, which suppresses damage(s) of the electric compressor 114, and the cover portion 24, and/or the motor generator 12 etc. disposed inside the cover portion 24. Since the electric compressor 114 and the motor generator 12 use the high voltage of AC 650 V, the safety performance against high voltage is properly ensured by suppressing the damage(s) thereof.

Since the earth cable 118 of the electric compressor 114 is connected to the upper-side crossmember 112, even if the attachment bracket 116 is broken, the electric compressor 114 can conveniently be prevented from falling off from the upper-side crossmember 112 by using the originally necessary earth cable 118.

Also, in the examples of FIGS. 1 to 9, the damage(s) of the electric drive unit 10 and/or the accessory component 70 can be suppressed by setting the strength (the number, thickness, material, etc.) of the attachment members 72, 72a, 72b such that the attachment, members 72, 72a, 72b are deformed or broken before any one of the accessory component 70 and the bottom portion 24a when a collision load is applied to the accessory component 70 disposed to project in the vehicle width direction via the attachment members 72, 72a, 72b on the bottom portion 24a of the cover portion 24.

Although the examples of the present disclosure have been described in detail with reference to the drawings, these are merely an embodiment and the present disclosure can be implemented in variously modified and improved forms based on the knowledge of those skilled in the art.

What is claimed is:

1. An electric vehicle comprising:
an electric drive unit including:
an electric motor used as a drive power source,
a transaxle including a differential device and coupled to a motor shaft of the electric motor in a power transmittable manner on one end side of the electric motor in a motor centerline direction to transmit an output of the electric motor through the differential device to a pair of drive shafts, and
a case housing the electric motor and the transaxle, wherein
the case includes a first end surface portion located on the other end side of the electric motor in the motor centerline direction and rotatably supporting the motor shaft, and
an accessory component of the vehicle is attached to an outside surface of the first end surface portion such that a gravity center of the accessory component is located at a position offset from the motor centerline.

2. The electric vehicle according to claim 1, wherein
the accessory component is attached to the first end surface portion via an attachment member such that the accessory component is separated from the first end surface portion.

3. The electric vehicle according to claim 2, wherein
the electric drive unit is mounted on a front-side portion of the vehicle in a posture in which the motor centerline is parallel to a vehicle width direction, wherein
the accessory component is attached to the first end surface portion via the attachment member such that the accessory component protrudes from the electric drive unit in the vehicle width direction, and wherein
the attachment member has a strength set such that when a collision load is applied to the accessory component from the vehicle front side, the attachment member is deformed or broken before any one of the accessory component and the first end surface portion.

4. The electric vehicle according to claim 3, wherein
the accessory component is a high-voltage electric component which works on a high voltage of AC 30 V or more and is electrically grounded by an earth cable of the high-voltage electric component connected to a vehicle body.

5. The electric vehicle according to claim 1, wherein
an elastic member is interposed between the accessory component and the first end surface portion.

6. The electric vehicle according to claim 1, wherein
the accessory component is a component generating vibration by itself.

7. The electric vehicle according to claim 1, wherein
the differential device is disposed on a second axis parallel to the motor centerline, wherein
the transaxle includes a gear type power transmission mechanism transmitting an output of the electric motor to the differential device, and wherein
the electric drive unit is mounted on the vehicle in a posture in which the motor centerline is parallel to a vehicle width direction.

8. The electric vehicle according to claim 1, wherein
the electric drive unit includes only the electric motor as the drive power source.

9. An electric vehicle comprising:
an electric drive unit including:
an electric motor used as a drive power source,
a transaxle including a differential device and coupled to a motor shaft of the electric motor in a power transmittable manner on one end side of the electric motor in a motor centerline direction to transmit an output of the electric motor through the differential device to a pair of drive shafts, and
a case housing the electric motor and the transaxle, wherein
the case includes a first end surface portion located on the other end side of the electric motor in the motor centerline direction and rotatably supporting the motor shaft, and
an accessory component of the vehicle is attached to an outside surface of the first end surface portion via an attachment member such that the accessory component is separated from the first end surface portion.

10. The electric vehicle according to claim 9, wherein
the electric drive unit is mounted on a front-side portion of the vehicle in a posture in which the motor centerline is parallel to a vehicle width direction, wherein
the accessory component is attached to the first end surface portion via the attachment member such that the accessory component protrudes from the electric drive unit in the vehicle width direction, and wherein the attachment member has a strength set such that when a collision load is applied to the accessory component from the vehicle front side, the attachment member is deformed or broken before any one of the accessory component and the first end surface portion.

11. The electric vehicle according to claim 10, wherein the accessory component is a high-voltage electric component which works on a high voltage of AC 30 V or more and is electrically grounded by an earth cable of the high-voltage electric component connected to a vehicle body.

12. The electric vehicle according to claim 9, wherein the accessory component is a component generating vibration by itself.

13. The electric vehicle according to claim 9, wherein the differential device is disposed on a second axis parallel to the motor centerline, wherein the transaxle includes a gear type power transmission mechanism transmitting an output of the electric motor to the differential device, and wherein the electric drive unit is mounted on the vehicle in a posture in which the motor centerline is parallel to a vehicle width direction.

14. The electric vehicle according to claim 9, wherein the electric drive unit includes only the electric motor as the drive power source.

15. An electric vehicle comprising:
an electric drive unit including:
an electric motor used as a drive power source,
a transaxle including a differential device and coupled to a motor shaft of the electric motor in a power transmittable manner on one end side of the electric motor in a motor centerline direction to transmit an output of the electric motor through the differential device to a pair of drive shafts, and
a case housing the electric motor and the transaxle, wherein the case includes a first end surface portion located on the other end side of the electric motor in the motor centerline direction and rotatably supporting the motor shaft, an accessory component of the vehicle is attached to an outside surface of the first end surface portion, and an elastic member is interposed between the accessory component and the first end surface portion.

16. The electric vehicle according to claim 15, wherein the accessory component is a component generating vibration by itself.

17. The electric vehicle according to claim 15, wherein the differential device is disposed on a second axis parallel to the motor centerline, wherein the transaxle includes a gear type power transmission mechanism transmitting an output of the electric motor to the differential device, and wherein the electric drive unit is mounted on the vehicle in a posture in which the motor centerline is parallel to a vehicle width direction.

18. The electric vehicle according to claim 15, wherein the electric drive unit includes only the electric motor as the drive power source.

* * * * *

UNITED STATES PATENT AND TRADEMARK OFFICE
CERTIFICATE OF CORRECTION

PATENT NO. : 10,625,591 B2
APPLICATION NO. : 16/136665
DATED : April 21, 2020
INVENTOR(S) : Yukinobu Nishikawa et al.

Page 1 of 2

It is certified that error appears in the above-identified patent and that said Letters Patent is hereby corrected as shown below:

On the Title Page

Item (72), inventors, inventor 1, address, delete "Anjo" and insert --Anjo-shi Aichi--, therefor.

Item (72), inventors, inventor 2, address, delete "Toyota" and insert --Toyota-shi Aichi--, therefor.

Item (72), inventors, inventor 3, address, delete "Nisshin" and insert --Nisshin-shi Aichi--, therefor.

Item (72), inventors, inventor 4, address, delete "Okazaki" and insert --Okazaki-shi Aichi--, therefor.

In the Specification

Column 2, Line(s) 31, delete "component," and insert --component--, therefor.

Column 4, Line(s) 8 & 9, delete "high voltage" and insert --high-voltage--, therefor.

Column 4, Line(s) 24, delete "art" and insert --an--, therefor.

Column 5, Line(s) 26, delete "Vehicle" and insert --vehicle--, therefor.

Column 6, Line(s) 53, delete "extend/" and insert --extend--, therefor.

Column 7, Line(s) 4, delete "high," and insert --high--, therefor.

Column 7, Line(s) 23, delete "component," and insert --component--, therefor.

Column 7, Line(s) 26, delete "level," and insert --level--, therefor.

Column 8, Line(s) 22 & 23, delete "corresponds," and insert --corresponds--, therefor.
Column 8, Line(s) 33, delete "between," and insert --between--, therefor.

Signed and Sealed this
Second Day of June, 2020

Andrei Iancu
*Director of the United States Patent and Trademark Office*

Column 9, Line(s) 19, delete "aid" and insert --and--, therefor.

Column 10, Line(s) 19, delete "therefore" and insert --therefore,--, therefor.

Column 10, Line(s) 31, delete "die" and insert --the--, therefor.

Column 12, Line(s) 33, delete "attachment/" and insert --attachment--, therefor.

Column 12, Line(s) 47, delete "fox" and insert --for--, therefor.

Column 12, Line(s) 50, delete "electric vehicle." and insert --electric vehicle--, therefor.

Column 12, Line(s) 54, delete "vehicle-front" and insert --vehicle front--, therefor.

Column 13, Line(s) 36, delete "attachment," and insert --attachment--, therefor.